United States Patent [19]

Watkins

[11] Patent Number: 5,079,056
[45] Date of Patent: Jan. 7, 1992

[54] REINFORCED THERMOSETTING RESIN STRUCTURE WITH INTEGRAL UNFLANGED NOZZLE AND METHOD

[76] Inventor: Richard L. T. Watkins, c/o Fibrex Corporation, 401 Sharon, Burlington, Wash. 98233

[21] Appl. No.: 473,358

[22] Filed: Feb. 1, 1990

Related U.S. Application Data

[62] Division of Ser. No. 212,414, Jun. 27, 1988, Pat. No. 4,931,119.

[51] Int. Cl.$^5$ .............................................. F16L 41/00
[52] U.S. Cl. ................................... 428/36.4; 285/150; 285/156; 285/293; 428/36.9
[58] Field of Search ............. 285/150, 156, 293; 29/890, 148; 428/36.4, 36.9

[56] References Cited

U.S. PATENT DOCUMENTS

| | | | |
|---|---|---|---|
| 2,751,237 | 6/1956 | Lonley | 156/191 |
| 3,676,579 | 7/1972 | Lanoue et al. | 285/189 |
| 3,765,979 | 10/1973 | Thomas | 285/156 |
| 4,652,020 | 3/1987 | Gilroy | 285/156 |
| 4,675,965 | 6/1987 | Offringa et al. | 285/156 |
| 4,676,532 | 6/1987 | Gronau et al. | 285/156 |

*Primary Examiner*—James J. Seidleck
*Attorney, Agent, or Firm*—Hughes & Multer

[57] ABSTRACT

A method and apparatus for fabrication of nozzles on reinforced thermosetting resin structures, more particularly, a method and apparatus for fabricating nozzles on pipe headers. A main pipe section is provided with a through branch outlet, and a shaped mold is provided to fit through the outlet and to provide a form for molding of the desired nozzle. Parts of the main pipe section which are adjacent to the mold are chamfered on the outside. Resinous matrix laminates are then provided to cover the mold and adjacent parts of the main pipe section. The method provides a smooth corrosion resistant interior joint between the pipe header and the new nozzle, with a new primary laminate providing both corrosion resistance and strength properties comparable to preformed pipe parts of the same resinous matrix laminate materials.

20 Claims, 8 Drawing Sheets

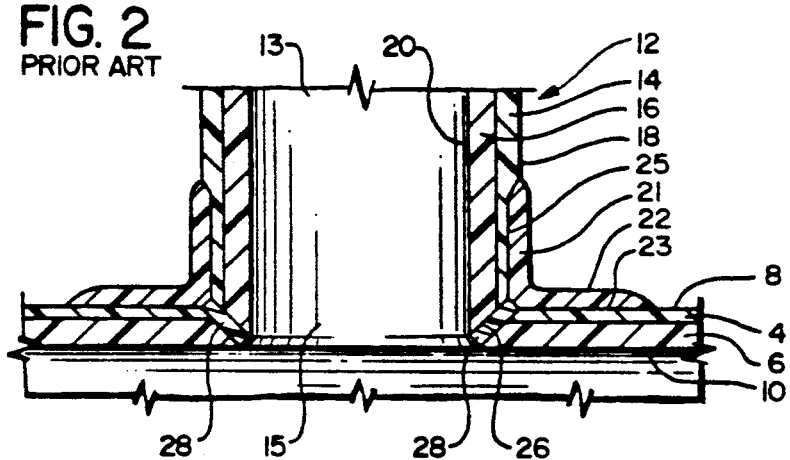
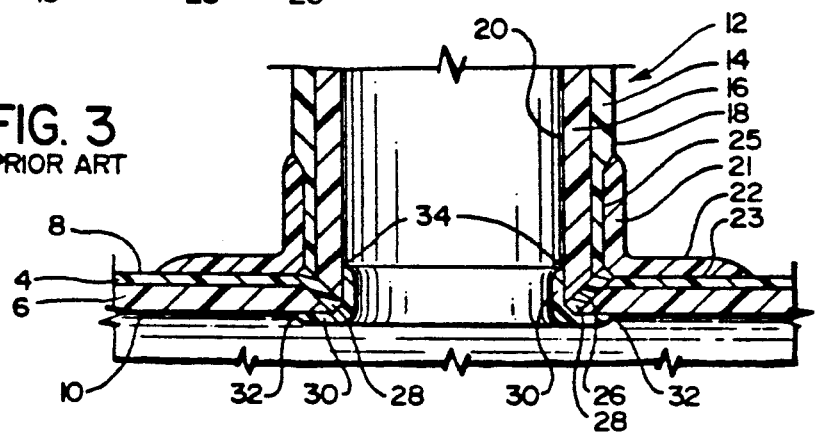
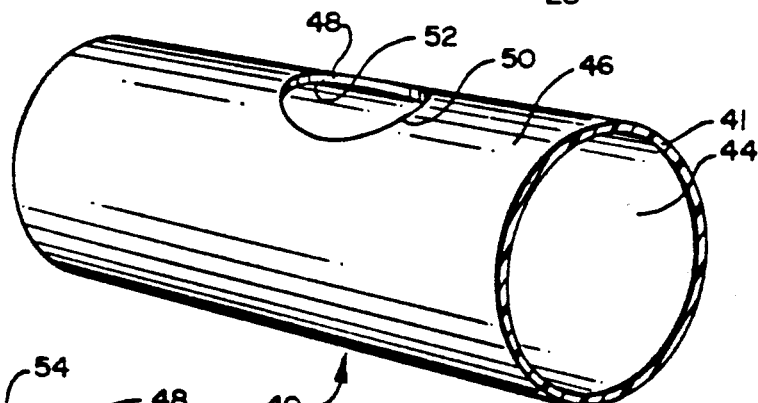
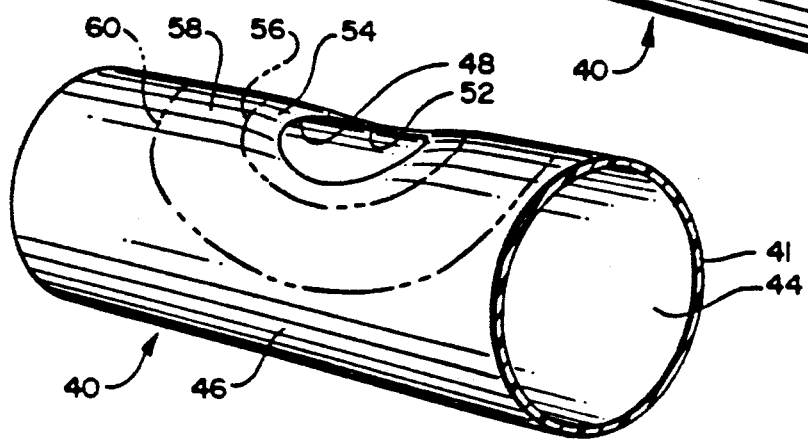

REINFORCED THERMOSETTING RESIN STRUCTURE WITH INTEGRAL UNFLANGED NOZZLE AND METHOD

CROSS REFERENCE TO RELATED APPLICATIONS

This application is a division of U.S. patent application Ser. No. 07/212,414 filed June 27, 1988, entitled "A METHOD FOR MAKING A REINFORCED THERMOSETTING RESIN STRUCTURE WITH INTEGRAL UNFLANGED NOZZLE," by Richard L. T. Watkins, now issued as U.S. Pat. No. 4,931,119.

TECHNICAL FIELD OF THE INVENTION

The present invention relates in general to a method of fabricating nozzles comprised of fiber reinforced thermosetting resin plastic materials with structures of similar composition, including, in its more specific aspects, to a novel, improved method for the fabrication of nozzles for fiber reinforced thermosetting resin pipe headers.

BACKGROUND OF THE INVENTION

A wide range of industries utilize pipe and vessels comprised of fiber reinforced thermosetting resin material. Such materials are commonly known in the trade as fiberglass reinforced plastic ("FRP") materials, as glass reinforced plastic ("GRP") materials, or simply as reinforced thermosetting plastic ("RTP") materials, although the reinforcing fibers are often composed of materials other than glass, such as polyester, carbon, mixed boron, kelvar, etc. For convenience, the term reinforced thermosetting plastic, or the abbreviation "RTP", will be used herein, however, it is to be understood that the present invention is applicable to each of the above described materials, and to materials with similar molding and forming characteristics, through a range of variation in resin or resin-like formulations and reinforcing materials. Reinforced thermosetting plastic RTP materials are selected for service because of the need for materials which are corrosion resistant and which have adequate strength. Typical uses for corrosion resistant RTP equipment include pipe headers and drying towers (as used in chlorine manufacture), generators (as used in chlorine dioxide units), process reactors and piping (such as for fertilizer plants and chemical plants), scrubbers, coolers and vaporizers (as used in sulfuric acid plants), evaporators, waste tanks, recovery tanks (as used in mining or chemical manufacturing), cells, tanks, and recovery units (as in tin, lead, copper, or other metal extraction plating or purification units), washer hoods and bleach towers (as used in wood pulping), or as in chimney liners (as used in power plants and incinerators), petroleum processing, water treatment plants, and a variety of other uses.

Reference will on occasion be made below to the joint or to the juncture between a main pipe header or corresponding structure and a branch pipe part or similar structure. This is done simply for the sake of convenience and clarity and is not intended to limit the scope of my invention which is, in general, applicable to fabrication of any structure having angularly intersecting fluid containing portions. Also, directions of up, down, top, bottom, etc. are used for convenience and may correspond to illustrations provided, however, it is to be understood that the present invention provides a method and apparatus equally applicable to fabrication of parts at any desired branch pipe part orientation. In illustrations herein, nozzles may be shown in a direction that is perpendicular to the longitudinal axis of a main pipe part, however, the method of the present invention is adaptable to nozzle fabrication at any desired angle by creating a suitable mold shape and by including an angle in the mold support means designed for positioning a mold at the proper angle relative to the main pipe part. In addition, it is to be noted that the terms interior and exterior are used only for convenience in providing an explanation of the present invention. Such use is for illustrative purposes and in no way limits the scope of the present invention. There are applications where nozzles are desired on the "interior" rather than the "exterior," and where the method of fabrication taught by the present invention is particularly useful. Examples include but are not limited to applications such as "through hull" fittings for boats, ships, marine bulkhead applications, and aircraft of composite or resin-like materials of construction, or the like.

In structures of the character under consideration, a problem arises at the junctures between the main pipe part and an attached nozzle. Unlike metal pipe parts, attachments of RTP parts cannot simply be welded together and still provide adequate strength and corrosive resistance at such juncture or corner. In many different types of service, there is a need for improved corrosion resistance in equipment of RTP construction. In particular, there exists a need for improved corrosion resistance at joints and at nozzle connection points in RTP equipment.

In vessels constructed according to presently practiced methods, it is common for the initial failure point in RTP vessels and pipe systems to be the point of attachment, or joint, between the vessel and a nozzle which has been attached during fabrication.

In the fabrication of RTP equipment there are various methods known for attachment of nozzles to pipes or vessels. A traditional method of fabrication is known as the "tee insert" connection. The header is prepared by cutting a hole therein, the nozzle placed against the header or vessel and the parts joined by using a secondary overlay wrap of resin impregnated glass cloth.

In a similar, but slightly improved method, edges of parts to be joined are beveled so that bevels on the nozzle and on the vessel match. These matched surfaces are coated with resin and then fitted together. There are a number of disadvantages to this method. It is fairly difficult to achieve an exact fit between the parts unless the beveled angle can be precisely manufactured. Since manufacturing of such joints is usually done by manual grinding of the end of the nozzle and of the edge of the hole in the pipe or vessel, it is a normal result of such method of manufacture that voids are created which require filling. The filler is subject to corrosion and erosion and the result is low corrosion resistance in the joint between the two pipe parts. Also, the joint is sharp and angular. Thus, during fluid flow, turbulence is created, which tends to increase corrosion attack.

Attempts have been made to improve the quality of joints created by the mating of matched mitered parts. For example, U.S. Pat. No. 3,873,391 shows, in FIGS. 3 and 4, a method of attachment wherein predesigned complementary metered edges are fitted together and secured by means of cement, and thereafter a liquid mixture coating of elastomer resins are applied to the external surfaces of the preformed pipe subsections adjacent to the joint. Thus, the strength of the joint is enhanced. However, in such methods, the corrosion resistance of the joint is not improved.

In larger vessels, typically larger than eighteen inches (18") diameter, it is feasible to put a resin rich interior overlay on the joint created by the method described above. Although such an overlay is a considerable improvement over the method used on smaller diameter pipes, the overlay protrudes from the finished surface of the vessel or pipe part. The overlay therefore creates turbulence in fluid flow and exacerbates corrosion and erosion at the joint. Although the service life of such an "inside overlay" joint is greatly improved over a joint without the inside overlay, the result is still a joint which is quite susceptible to corrosion attack when compared to a smooth molded surface in the vessel or piping system.

In the case of nozzle attachment to pipe or vessels having a diameter of approximately eighteen inches (18") or smaller, it is usually not possible to include a corrosion barrier overlay on the inside of such joint. Thus, the corrosion barrier is interrupted at the joint. Further, corrosion and erosion of joint materials exposes the reinforcement fibers, thus, the entire joint may fail.

Changes in fluid flow direction at nozzle attachment points result in a variety of shear, tensile, and torsion forces due to the hydraulic and fluid dynamic action on the joint. Where RTP parts are joined, one failure mode is for the bond joining the overlay to the primary laminate to fail, resulting in the overlay becoming separated from the primary parts. This phenomenon is known as peeling. Another failure mode is for corrosion and erosion of an initial resin rich layer to expose the reinforcing fibers, allowing further corrosive and erosive attack and thus weakening the joint.

In other known methods for manufacture of FRP vessels, pipe headers, and pipe parts, "stub molds" are mounted directly on the primary mandrel used for producing the main pipe part or vessel. A rounded fillet is created at the juncture of the mandrel and the stub mold by using wax. Resin impregnated fiber is laid down over both the stub mold and the mandrel, and the result is a smooth, rounded corner, with a continuous resinous matrix laminate. Although this results in an equally corrosion resistant and servicable joint as the present invention, it has several disadvantages. The stub mold method results in increased costs, primarily increased utilization time for tooling, and lower productivity of shop labor.

Methods similar to the "stub mold" method have been used for the manufacture of fiber reinforced plastic pipe parts, such as pipe tees. Descriptions may be found in the U.S. Pat. No. 4,601,496, or in earlier variations as shown in U.S. Pat. No. 4,106,797 and U.S. Pat. No. 3,765,979. Fundamental to each of these methods is the simultaneous use of a mandrel on each axis; i.e., a mandrel for the main part and another mandrel for the branch part. A solid one-piece, two-axis, expendable mandrel is disclosed in U.S. Pat. No. 4,601,496, in FIG. 1.

BRIEF SUMMARY OF THE INVENTION

I have now invented and am disclosing herein a novel method of fabricating a pipe header with unflanged nozzles which solves the problems posed in the preceding paragraphs by insuring that the wanted corrosion resistant and strength properties are obtained at the juncture where the nozzle intersects the main pipe part.

My invention provides a new way to attach a branch pipe section to a main RTP pipe section. The main pipe section is prepared by chamfering the exterior of the pipe section adjacent to a through branch opening in the pipe section. Further, the exterior surface of the main pipe part is roughened adjacent to the sloping chamfered surface. Then, a smooth mold member having a branch forming portion, a flange portion and a transition portion is positioned inside the main pipe section so as to locate the branch pipe section. A mold member is constructed so that the flange portion provides a surface which is shaped like the interior of the main pipe part, and so that the branch forming portion provides a surface which is the size and shape of the interior of the desired branch pipe part, and so that a smooth transition portion is provided between the branch forming surface and the flange portion surfaces.

Once the mold is positioned, a quantity of resin material is applied to wet the mold, and more particularly to wet the branch forming portion of the mold, the transition portion of the mold, the adjacent parts of the main pipe section. The initial resin rich layer is completed by including a veil type reinforcing cloth application, fully wetted out in accordance with standard fabrication techniques. Usually, this initial resin rich layer is allowed to cure before proceeding with additional laminates, so that the initial layer is not compressed, decreasing the ratio of resin to reinforcing material, and thus thereby decreasing the corrosion resistance. However, initial layer(s) of chopped strand mat are normally used to complete the base layer of resinous matrix. After the base layer has cured, support means for the mold are disengaged, and the mold is removed. Additional layers of resin saturated reinforcing fiber are then laminated over the base layer to complete the desired corrosion resistance and strength properties of the joint and new branch pipe section. Alternately, the entire joint and new branch pipe section can be completed with the mold in place.

The unflanged nozzle of the present invention is formed by the following process. First, a primary structure is provided which comprises a primary structure wall with an interior surface and an exterior surface and has a through branch opening defined by a wall edge portion.

A mold member is then provided which comprises a branch forming portion adapted to be positioned inside a branch pipe section so as to position the branch pipe section, a flange portion having a locating surface adapted to engage an interior edge surface portion of the interior surface of the primary structure adjacent to the branch opening, and a transition portion interconnecting the branch forming portion and the flange portion, the transition portion having an outer forming surface portion.

The mold member is located in an operating position where the branch forming portion extends outwardly from the through opening and the flange portion sits against the interior edge surface portion. The transition portion is configured so that, with the mold member in its operating position, the outer forming surface is tangentially aligned with an inner edge surface portion of the primary structure.

A quantity of resin is then applied to the outer forming surface of the mold and to adjacent portions of the structure to form a new pipe section attached to the primary structure and providing a transition surface portion blending into the interior edge surface portion of the primary structure so as to form a finished article. The mold member is then disengaged from the interior edge surface portion of the primary structure, and the mold member is removed from the finished article.

The pipe header of reinforced thermosetting plastic construction of the present invention comprises a main pipe section and at least one branch pipe section joined at an angle to the main pipe section. The main pipe header includes a smooth interior surface transition at the juncture between the main pipe section and the branch pipe section. This smooth interior surface provides a continuous and uninterrupted corrosion barrier. Further, the main pipe section contains a branch portion integrally formed thereon by fabrication of a nozzle on the main pipe section, where a resinous matrix provides the juncture and forms a continuous corrosion resistant laminate that permanently bonds the main pipe section to the branch pipe section.

OBJECTS OF THE INVENTION

Fiberglass industrial equipment is normally manufactured with an inner resin rich corrosion barrier. This corrosion barrier is most effective when it is smooth and uninterrupted along the interior surface. Therefore, it is particularly advantageous to form fiberglass vessels, pipes and headers on a smooth mold so as to provide maximum corrosion resistance. Thus, a method to achieve such a result when fabricating unflanged nozzles is particularly desirable.

It is an object of the present invention to fabricate unflanged nozzles on a main pipe part, or on a vessel or other structure with a continuous and uninterrupted corrosion barrier, thereby eliminating or minimizing the possibility of corrosion attack.

It is another object of this invention to product a joint and branch pipe section where the continuous and uninterrupted corrosion barrier is smooth and flush with both the main pipe part or vessel, which overcomes or reduces the above referenced drawbacks of the prior known methods of nozzle construction.

It is yet another object of this invention to produce a joint which decreases fluid flow turbulence and stress fatiguing.

It is a feature of the present invention that a new primary laminate is provided to form a new unflanged nozzle.

It is a feature of the present invention that a mold is required along only one axis of the finished branch pipe section during the nozzle fabrication process.

It is a further feature that the one-axis mold method of the present invention is simple and provides lower manufacturing costs when compared to known methods.

It is an advantage of this invention that a joint is produced where there are no voids in the joint requiring filler or putty.

It is an advantage of the present invention that a smooth interior surface is created in the interior joint and branch pipe section, thus minimizing the possibility of corrosion.

Several advantages of my novel pipe header structures have been identified above. Yet another important advantage of my invention, alluded to above, is that there are no internal or external mechanical splices or overlaps between the main pipe sections and branch pipe sections of the structure. This is important because inside splices are disruptive to fluid flow, and both the external and internal overlays are expensive.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The invention may be more clearly understood by reference to the accompanying drawings thereof, wherein:

FIG. 2 is a partial, vertical, sectional view of a point of nozzle attachment, similar to FIG. 1, showing a nozzle installed on a pipe header utilizing an external overlay, as presently known in the art.

FIG. 3 is a partial, vertical, sectional view of a point of nozzle attachment, enlarged so that details of a mitered joint and interior and exterior overlay as presently known in the art are clearly seen, taken along line 3—3 of FIG. 1.

FIG. 4 is a perspective view of a pipe header or main pipe section, to which it is desired to attach an unflanged nozzle in accord with the present invention.

FIG. 5 is a perspective view of a pipe header or main pipe section to which it is desired to attach an unflanged nozzle, showing surface preparation on the pipe header or main pipe section in accord with the present invention.

DETAILED DESCRIPTION OF THE INVENTION

Figure 1:
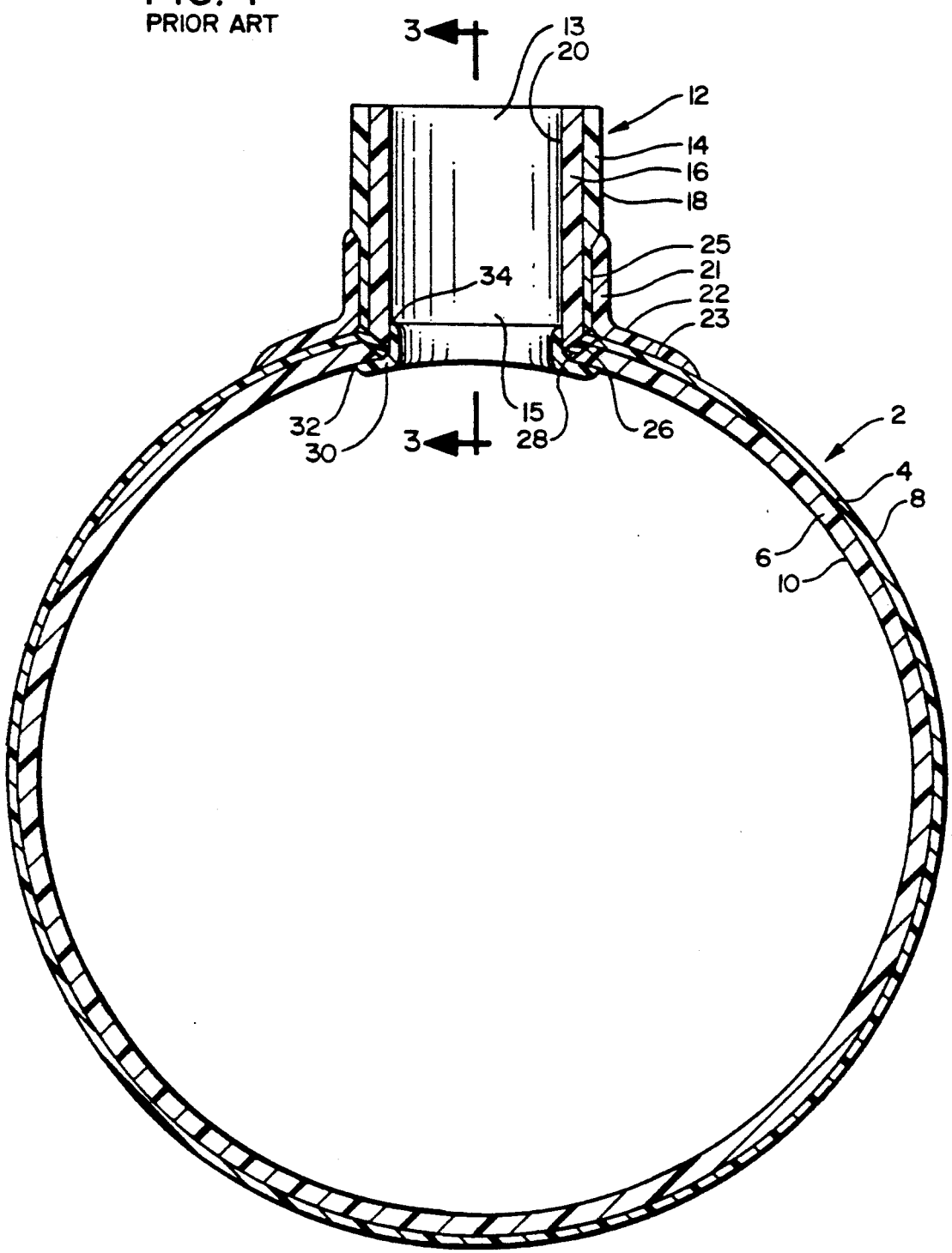
FIG. 1 is a vertical, sectional view showing a main pipe section or header, with an unflanged nozzle installed thereon by presently known methods.

It is necessary in a variety of reinforced thermosetting plastic "RTP" structures, and particularly in pipe headers, to attach unflanged nozzles thereto. By way of background, a typical method of attachment for unflanged nozzles as known in the art is shown in FIG. 1.

A main pipe header or main pipe section 2 has an interior wall surface 10, a corrosion barrier laminate 6, a structural laminate 4, and an external wall surface 8. A preformed branch nozzle section 12 is provided for attachment to pipe section 2. Preformed nozzle 12 has an interior wall surface 20, a corrosion barrier laminate 16, a structural laminate 14, and an exterior wall surface 18. The preformed nozzle section 12 also has an outlet end 13 and a stub end 15. To join the preformed nozzle to the pipe header, it is common practice to create a mitered surface 26 on the stub end 15 of the preformed nozzle 12. An aperture is created in the main pipe section 2, and the edges of the main pipe section adjacent to the aperture are shaped to be complementary to mitered surface 26 on the preformed nozzle. Resinous material is applied to the surfaces to be joined, and the complementary mitered surfaces sections are fitted together. It is common that such method of manufacture results in creation of voids which must be filled by use of resinous filler or putty 28. In most instances, an exterior overlay 21 is applied around the periphery of the joint, covering adjoining surface 23 on the main pipe section 2, and adjoining surface 25 on the preformed nozzle 12. The external overlay 21 also has an exterior surface 22. Although the external overlay 21 improves the strength of the joint, it does not improve the corrosion resistance of the joint against fluids contained in the header. Further, a common failure mode of such joints is for vibration or fluid pressure leaking through the joint to force the resinous matrix of the overlay 21 to be separated from nozzle 12 and from pipe section 2, at the joining surfaces 23 and 25 respectively, a phenomenon known as "peeling".

In vessels typically larger than eighteen inches (18") diameter, it is feasible to put a resin rich interior overlay 30 inside the joint. The overlay 30 protrudes from the pipe section interior wall finished surface 10. It also protrudes from the interior finished wall surface 20 of the preformed nozzle. Deposits may also form at the joint 34 between the interior overlay 30 and the nozzle section, as well as at the joint 32 between the interior overlay and the main pipe section. Thus, the overlay 30 creates turbulence in the flowing fluid, and exacerbates corrosion and erosion at the point of nozzle attachment.

FIG. 2 shows a sectional view along a longitudinal direction of a main pipe section. However, FIG. 2 illustrates the joint typically constructed for main pipe sections with less than eighteen inches (18") diameter where it is impractical or impossible to include an interior overlay in the joint. In such smaller vessels, the corrosion barrier is completely interrupted at the joint, thus exposing putty 28. The erosion of the putty or filler material 28 may expose ends of reinforcing fibers, weakening or eroding them, causing the joint to ultimately fail.

FIG. 3 is a partial vertical sectional view similar to the view shown in FIG. 1. However FIG. 3 is taken along the longitudinal direction of the main pipe section, along the line 3—3 of FIG. 1, rather than along the cross sectional direction that is illustrated in FIG. 1. FIG. 3 further illustrates the use of an interior overlay 30 to prevent corrosion or erosion at a mitered joint. It can be clearly seen in FIG. 3 that the abrupt direction changes created by use of such an interior overlay create an irregular surface that interrupts smooth fluid flow. Although the use of such an interior overlay 30 is a clear improvement over the unprotected mitered joint illustrated in FIG. 2, such fabrication technique fails to provide smooth interior surfaces for fluid flow, and fails to eliminate protruding surfaces which can initiate corrosion and erosion in pipe section.

The present invention involves a novel and improved apparatus and method to fabricate RTP nozzles for RTP vessels or pipe sections. While the illustrated embodiments of the invention show main pipe parts and branch nozzles of cylindrical configuration, such is not intended to limit the invention to the particular configuration or to limit it to a specific size or shape. The method of the present invention, and apparatus therefore is uniquely capable of providing a way of joining various RTP parts, by creating a mold shaped for the particular configuration of parts which are to be joined.

Attention is now directed to FIG. 4, a perspective view of a main pipe header or main pipe section on which it is desired to fabricate a nozzle by the method of and use of the apparatus of the present invention. The main pipe section 40 has a pipe wall 41 with an interior wall surface 44 and an exterior wall surface 46. The main pipe section 40 has a through branch outlet or aperture therein defined by a wall edge portion 48 of the main pipe section. The wall edge portion 48 has an exterior or top edge surface portion 50 and an interior or bottom edge surface portion 52.

FIG. 5 is a perspective view of the same main pipe section as illustrated in FIG. 4, however preparation of the header 40 for attachment of a nozzle in accordance with the present invention has been performed. Exterior surface 46 of the main pipe section has a roughened area 58 from the bottom wall edge surface portion 52 to a roughened surface limit at line 60. The surface of the main pipe section must be roughened to create a good adhering surface to enhance bonding efficiency for application of further resinous laminates. Roughening is also required since the usual technique for RTP pipe fabrication includes use of a wax in the final exterior coat, to promote proper curing of air inhibited resin compositions. This roughening is generally accomplished by lightly sanding the surface of the header to remove the top wax layer. The roughening and sanding operation must create a surface free of moisture, dirt, waxes, or other contaminants. Final roughening of surface preparation must occur within a few hours, preferably not more than twenty four (24) hours, prior to application of the initial resin coat. The roughened surface 58 extends from the bottom edge surface portion 52 of the main pipe section adjacent to the through branch outlet or aperture all the way out to roughened surface limit at line 60. Beginning at line 56, the exterior surface portion of the main pipe section is removed and a chamfered edge is created from line 56 to the bottom edge surface portion 52. It will be seen in later drawings that the effect of chamfering around the aperture is to create a sharp angle alpha ($\alpha$) between the sloping surface 54 and the interior surface 44 of the main pipe section 40. Angle alpha is usually in the range of 45° or less, and preferably 30° or less, and when required, may be 20° or less. At bottom wall edge 52, the apex of this sharp angle, the interior pipe wall 44 meets sloping surface 54. In practice, the exact edge 52 may not be preserved during the grinding operation, and a new edge, 52, may be formed. However, only edge 52 is shown in the accompanying drawings.

Figure 6:
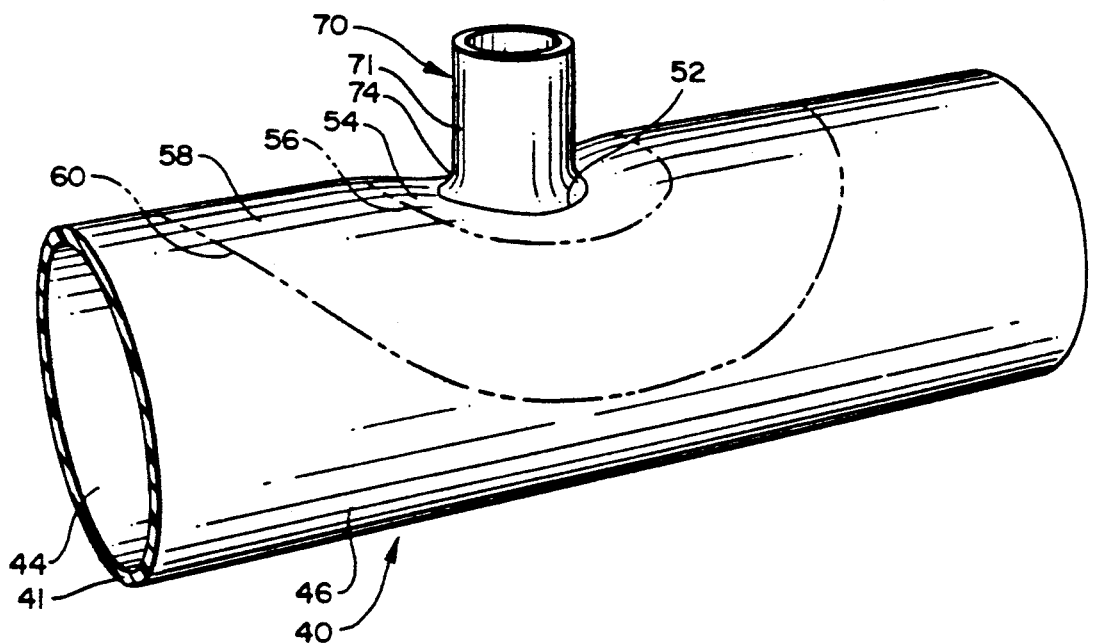
FIG. 6 is a perspective view of a pipe header or main pipe section, showing a mold being positioned at the desired point of nozzle fabrication in accord with the present invention.

FIG. 6 illustrates the same main pipe section as previously illustrated in FIG. 5, however in FIG. 6 a mold 70 has been positioned in the through branch outlet defined by bottom wall edge 52 of header 40. In fabrication of a nozzle in accord with the present invention, mold 70 is positioned and supported by means which will be subsequently discussed.

Before turning to the next FIGURE, the details of mold 70 must be further explained. A proper fitting mold is essential to practice of the present invention. It is generally necessary to make a new mold each time a new nozzle shape or size is desired, and each time a new header or vessel configuration is required. For instance, nozzles could be constructed for rectangular, triangular, elliptical or other unusual shapes for through branch outlets from a main pipe section or header, or from a tank or container. Essential features of the mold are that it provide a smooth transition from the main part to the branch part. Thus, the mold surface should have a flange portion (see No. 72 of FIG. 7) with a point of tangency with the interior wall 44 of the main pipe part 40, and a branch locating portion 71 which has the desired size and shape of the interior wall of the nozzle being fabricated. There should be a smooth transition portion 74 between the flange portion and the branch locating position. By utilizing a mold as taught by the present invention, it is possible to provide a smooth transition from the interior of the main pipe section to the fabricated nozzle, eliminating sharp angles in the joint, and thus eliminating flow disturbances caused by interior overlays.

The mold must define a smooth transition curve from the point of tangency at the interior wall 44 of the main pipe part to the interior wall of the newly formed branch nozzle. The shape of the curve defining this transition may be a circular curve, a compound curve, or may be defined by parabolic or other mathematical expression. Although nozzle fabrication is illustrated herein with the branch nozzle at a ninety (90°) degree angle from the main pipe section, or "tee" fitting, it is to be understood that the present invention is equally applicable to fabrication at other angles, such as a forty five (45°) degree angle or "wye" fitting, or at various other angles. Fabrication of nozzles at various angles can be accomplished by use of individually prepared molds which define a smooth transition curve from the main pipe section to the desired branch nozzle location, and by a support rod means (see No. 95 of FIG. 7) which is modified so that the rod changes direction near the main pipe section to a direction generally coaxial with the desired angle of the branch nozzle to be attached. Further, the function of a support rod means could be alternately accomplished by use of a multiple legged device, such as a tripod, by use of a simple jack or by other suitable means. And, where an interior support surface portion of the main pipe is not readily accessable, or in the case of articles other than pipe sections, external legs or braces, or suction cup means against the structure itself, could be used for support rod means components. However, the support rod means depicted herein has been found to be quite helpful in allowing the mold to be manipulated and positioned from the outside of the main pipe section, rather than requiring workmen to manipulate apparatus in the interior of the main pipe section. This feature is extremely helpful when fabricating nozzles on long pipe header sections, and when fabricating nozzles on small diameter pipe sections where it is difficult or impossible for workers to enter the pipe section. Also, to facilitate mold positioning and recovery, a string or cord 136 can be attached to the mold.

Molds can be prepared from a variety of suitable materials, however, the following method has been utilized with success:

a) Prepare a male mold from metal pipe parts, by attaching pipe sections of appropriate diameter. Build up weldment or fillet sufficient to provide a desired transition curve shape, and complete by grinding and polishing the weldment or fillet to provide a smooth, uniform surface.

b) Use the just completed metal male mold to build a corresponding female mold of suitable RTP materials.

c) Form the working male mold by use of a silicone elastomer molding compound, such as RTU-HS from the Dow Chemical Company, in the just completed female RTP mold. A silicone rubber moldmaking compound such as Dow Corning 3112 RTV Silicone Rubber with Dow Corning No. 1 catalyst or curing agent, available from the Dow Corning Company, Midland, Michigan, is equally useful.

In forming the mold, precise manufacturing tolerences are required so that the size and shape of the mold exactly matches the size and shape of the relevant portions of preformed main pipe section and the desired interior size and shape of the nozzle. The mold is pressed against the interior wall of the main pipe section in a tight fit relation so as to seal the joint between the interior wall of the main pipe section and the mold.

Figure 7:
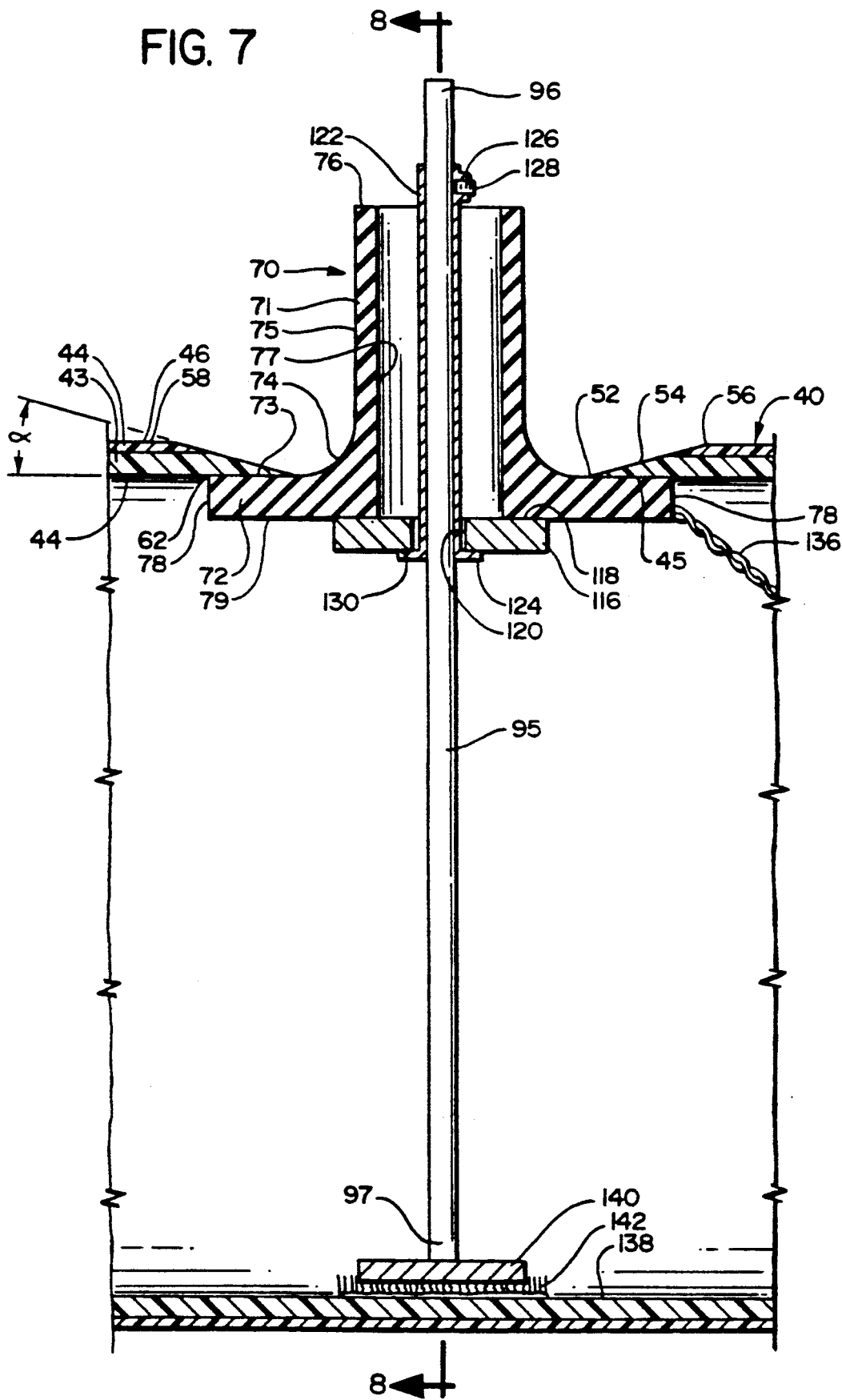
FIG. 7 is a vertical, sectional view taken in the longitudinal direction of a pipe header or main pipe section, showing a mold being positioned at the desired point of nozzle fabrication in accord with the present invention.

Turning now to FIG. 7, a mold 70 is depicted in vertical cross section along the longitudinal axis of a main pipe header 40. The main pipe header can be seen to have an interior wall 44, a corrosion barrier laminate 43, a structural laminate 42, and an exterior wall 46. The exterior surface of the main pipe section 40 has been prepared as shown in FIG. 5 and FIG. 6. The roughened exterior surface 58 extends to line 56 where a sloping or chamfered surface 54 begins. The chamfered surface 54 ends at the bottom wall edge portion 52 of the main pipe section. The main pipe section also has an interior edge surface portion 45. Mold 70 is composed of two major sections, a branch forming portion 71 which extends to locate and form the branched nozzle, and a flange portion 72 for sealing against the interior wall 44 of the pipe section 40 and for providing surface sufficient to support the mold against the interior wall 44. The mold flange portion 72 has further important details, including locating portion 73 which seals the mold against the interior pipe section wall 44, and a pair of flanged portion outer ends 78 in the longitudinal direction. The locating portion 73 fits tightly against the main pipe section interior edge surface portion 45 of the main pipe section interior wall. A junction 62 is defined between the flanged portion outer ends 78 in the longitudinal direction and the main pipe interior section wall 44. Mold flange portion 72 also has a bottom surface 79.

The mold is supported by means of a support plate or ring 116 having an inner wall 120 which defines an aperture for passage therethrough of support sleeve 122 which is slidably engaged to support rod 95. Mold support sleeve 122 can be slidably adjusted from outside the main pipe header so that the mold can be secured in a tight fitting relation to the interior pipe wall 44. With a properly fabricated working mold and a properly positioned mold, support sleeve 122 can be adjusted so that bottom support flange 124 of sliding support sleeve 122 compresses support ring 116 along compressing surface 130 of the support ring, thus that along compressing surface 118 of support ring, the mold 70 is compressed upwardly. Thereby, a seal is provided between mold 70 and main pipe section 40 at the bottom wall edge surface portion 52. The sliding mold support sleeve 122 is secured at the desired operating position. An internally threaded portion or hub 126 of sliding support sleeve 122 threadably engages a threaded allen bolt 128 such that an allen wrench (not shown) can be inserted at allen bolt 128 to rotate the allen bolt so that the allen bolt is compressed against support rod 95 to secure the sliding support sleeve 122 against rod 95. The objective is to provide a means to securely position sliding support sleeve 122 at the desired height on support rod 95. It will become obvious as the invention is practiced that other means for retaining the mold at the desired height will be acceptable and will achieve equivalent results. For example, if support rod 95 were threaded, the support sleeve 122 could be internally threaded and rotatably adjusted to secure the mold 70 at the desired position.

It can also be seen in FIG. 7 that the mold is configured to provide an aperture therein for passage therethrough of support rod means 95. The branch forming portion 71 has an inner wall surface 77 which defines an opening of sufficient size for passage of support rod means through the mold. Also, support rod means 95 may also include at the bottom end 97 a protective block 140 of wood or other suitable material, and carpet remnant 142 so that the interior wall surface 44 of the header, and in particular the interior surface support portion 138 of main pipe section 40, is not damaged during the nozzle attachment process. Further, the branch forming portion 71 of mold 70 has a top end 76.

Figure 8:
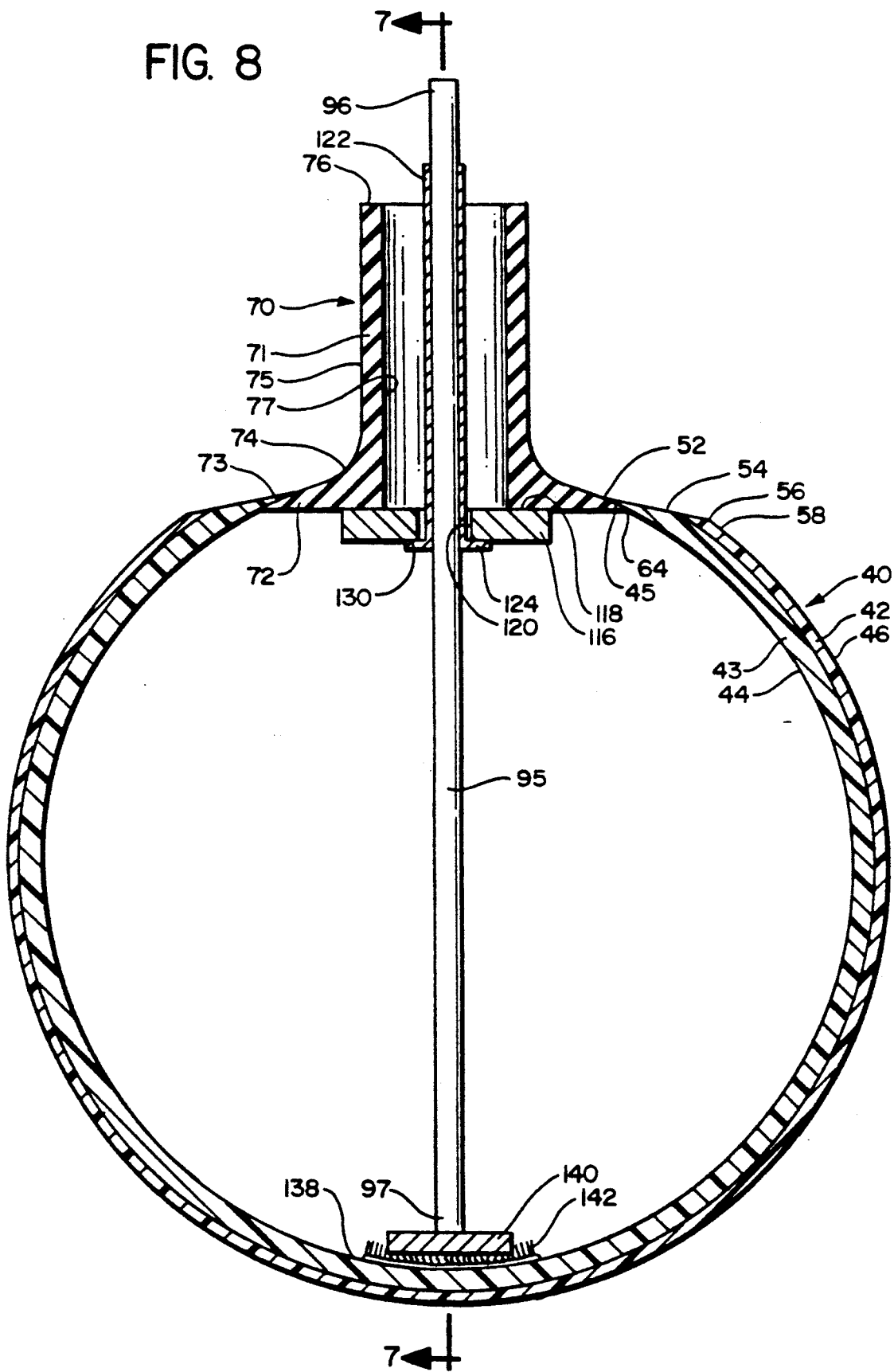
FIG. 8 is vertical, cross-sectional view of a pipe header or main pipe section, showing a mold being positioned at the desired point of nozzle fabrication, taken along the line 8—8 of FIG. 7.

FIG. 8 shows a vertical cross-sectional view of a main pipe header with a mold in place ready for fabrication of a nozzle in accordance with the present invention. The view is taken along line 8—8 of FIG. 7. Here, the flanged portion 72 of mold 70 can be seen to provide a smooth curve contoured exterior surface to match the interior curvature of the main pipe header 40. This smooth portion of the mold exterior is termed the flange portion locating portion 73. The flange locating portion 73, when in the operating position, is secured in a tight fitting relationship with the interior wall 44 of the main pipe section. Mold flange portion 72 extends outward to a mold flange portion outer edge 64 at either end of the mold when viewed in a cross-sectional direction. A smooth transition between mold flange portion 72 and the mold transition surface 74 at the bottom wall edge surface portion 52 insures that a smooth interior surface of the finished joint can be created. The outer surface of the mold branch locating portion is known at the mold branch forming portion outer surface 75.

Figure 9:
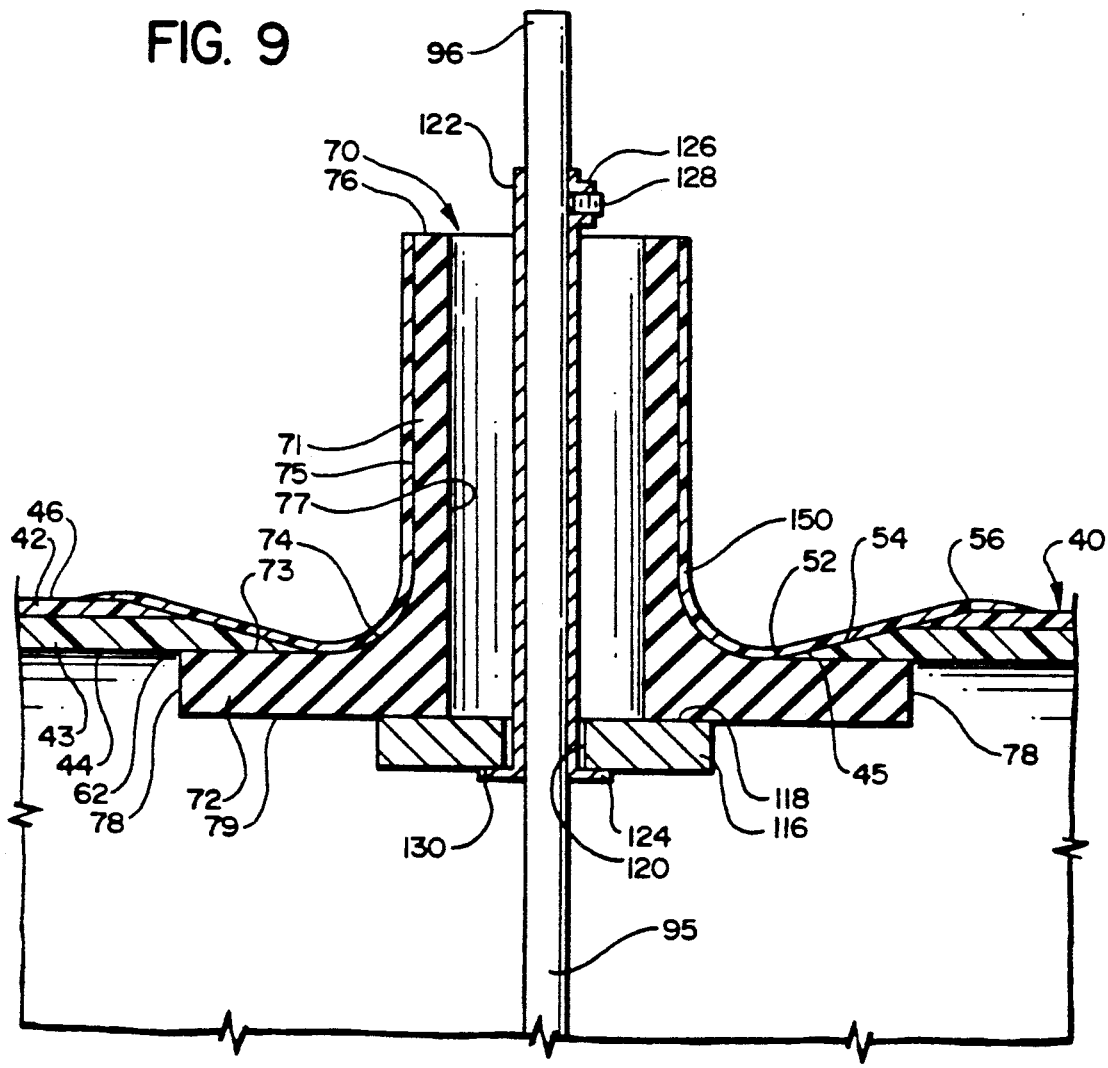
FIG. 9 is a vertical sectional view of a point of nozzle fabrication showing placement of the base layer of resinous matrix in accord with the present invention.

Turning now to FIG. 9, application of a base layer of resinous matrix 150 can be seen. Exposed portions of mold 70 and the adjacent areas of pipe header 40, and more particularly the sloping chamfered surface 54 on the main pipe header 40, are wetted with resin. The resin wetted surfaces are coated with one or more layers of resin impregnated C-veil fiber or equivalent depending upon the chemical service environment. The base layer also normally includes at least two layers of one and one-half (1½) oz. chopped strand mat, however, actual base layer requirements may vary depending upon resins and reinforcing materials used in the particular application. The fresh resin layer(s) are worked with brush and/or rollers to fully wet the reinforcing fibers and to remove trapped or entrained air bubbles. After the base layer or layers of resin and reinforcing fiber matrix cure, the mold 70 and support post 95 are removed. Then, additional layers of resin saturated glass reinforcement are laminated on the base layer of resinous matrix 150 which has just been applied.

Figure 10:
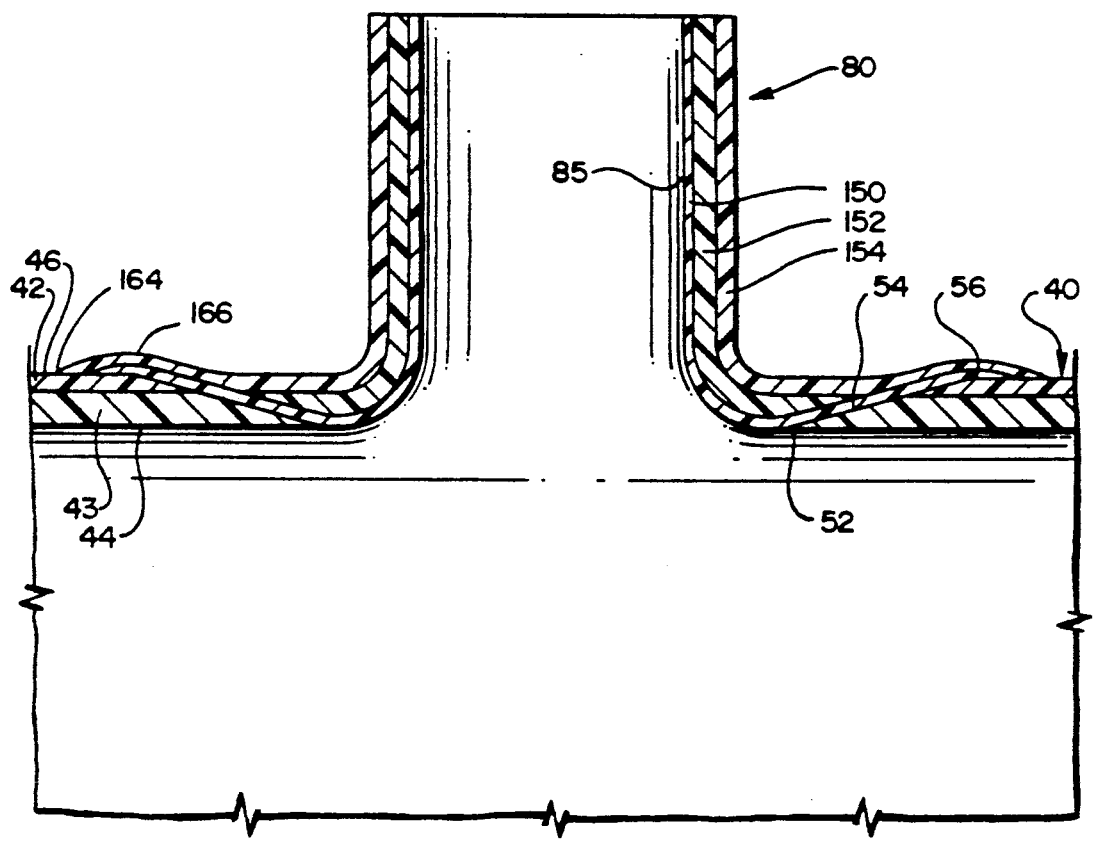
FIG. 10 is a vertical sectional view of a point of nozzle fabrication showing a completed nozzle with resinous laminates applied in accord with the present invention.

Turning to FIG. 10, a completed nozzle fabricated according to the present invention can be seen. FIG. 10 is a vertical sectional view of a portion of a joint between a main pipe section and a nozzle along the longitudinal axis along the main pipe section. Most striking in this view is the smooth transition provided between the main pipe vessel and the nozzle. The new resinous matrix 150 provides a transition surface portion of new resinous laminate which has a smooth surface which is tangential with the main pipe header interior wall 44 at point 52, and provides a smooth curved transition where it ultimately becomes the interior pipe surface 85 of nozzle 80. Further, it can be seen that in addition to providing a smooth surface for fluid flow, there are no crevices for deposits to form or to serve as initiation points for corrosive processes. In addition to a first resin layer 150, a further corrosion barrier 152 is laminated over the joint, and then a structural laminate 154 is provided. The base resin rich corrosion barrier 150 and the additional corrosion barrier 152 can be varied in thickness to suit the application. Also, although initial layer 150 and corrosive barrier layer 152 are shown discretely for purposes of illustrating the fabrication procedure, the present method results in a single uniform resin rich corrosion barrier containing both layer 150 and layer 152, which may become vertically indistinguishable. Similarly, the structural laminate 154 can be varied as necessary to provide the strength for the particular application requirements. Although both corrosion and appearance concerns are normally less important on the vessel exterior, in the present invention an overlap of resin 156 is provided beyond initial chamfered point 56. This overlap area may be varied in width and extends out to a junction 164 where the new exterior laminate ends and the external pipe wall 58 begins. A final resinous layer must extend out to meet the unroughened exterior header pipe wall 46. Further, it can be seen in the most preferred embodiment that a smooth transition 166 is provided between the main pipe section and the new structural laminate.

Figure 11:
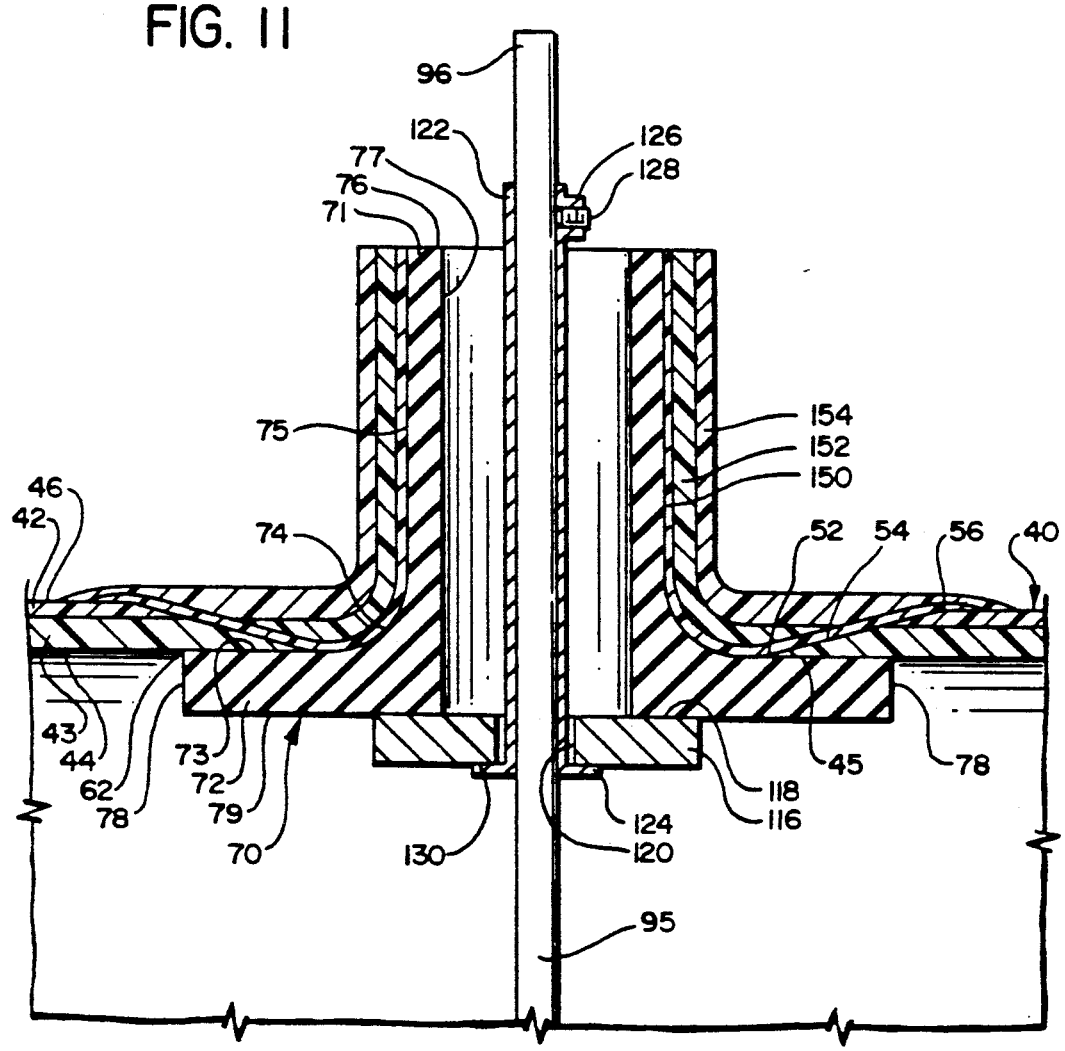
FIG. 11 is a vertical sectional view of a point of nozzle fabrication showing placement of further layer(s) of resinous matrix while the mold is still in place, as may be practiced in yet another embodiment of the present invention.

Turning now to FIG. 11, this vertical sectional view shows an alternative method of completion of this resinous joint wherein the mold 70 is left in place after the first layer or layers of resin cure and the entire joint is completed with the mold 70 still in place. Although this results in less efficient use of the mold and tooling in situations where multiple nozzles are being fabricated, it still results in a workable flanged nozzle attachment.

The present invention is illustrated by the following example. It will be understood, however, that the invention is not limited to the specific details of this example.

EXAMPLE

An unflanged pipe nozzle, six inch (6") nominal diameter, made from fiber reinforced thermosetting resin material, was fabricated to a twenty (20") inch diameter pipe header of fiber reinforced thermosetting resin material according to the method of the present invention. The header was made from a chlorendic polyester type resin, available from Ashland Chemical as Hetron-197. The fabricated nozzle had a side wall thickness of one-half (½) inch. The pipe header was prepared by cutting a through branch opening therein and grinding the exterior periphery of the header adjacent to the through branch opening to produce a sharp angle between the sloping exterior chamfered surface. A mold and mold support means was arranged to a predetermined position in the through branch opening.

The exposed portions of the mold and the adjacent areas of the pipe header were wetted with a premium quality corrosion resistant grade chlorendic polyester resin, available from Ashland Chemical Company as Hetron-197. Hetron-197 resins are cured through use of a catalyst with optional promoter. Commonly utilized are a benzoyl peroxide (BPO) catalyst with dimethyl analine (DMA) promoter, or methy ethyl ketone peroxide (MEKP) catalyst with cobalt napthenate promoter. However, it will be readily appreciated by those skilled in the art that the specific resin type is only important in regard to the corrosion resistance required for the material to be contained. A variety of resins, including but not limited to polyester, halogenated polyester, vinyl ester, epoxy type, isophthalic, furan, bisphenol-A fumarate, or other resins can be utilized to achieve the desired surface contour with the structural and corrosion resistant advantages of the present invention, without departing from the scope of the present invention.

The wetted surfaces were then coated with two (2) layers of resin impregnated veil weave glass cloth approximately ten (10) mils thick each. Veil weave known as C-veil, a glass fiber, or Nexus TM veil, a polyester fiber by Burlington Industries are equally applicable, the choice being dependent upon the chemical service environment. Nexus TM surfacing veil is available from Burlington Formed Fabrics, a division of Burlington Industries, N.Y., N.Y., and is found in apertured and non-apertured styles varying in weight from 1.05 to 1.3 ounces per square yard (ozs./sq. yd.), and thickness ranging from 0.011 to 0.014 inches. Veil is very fine and provides approximately 90% resin and 10% glass. Four layers of one and one-half (1½) oz./yd$^2$ chopped strand mat, Certainteed #M-113, saturated with a chlorendic polyester resin, Ashland Chemical Company #Hetron-197, were then used to complete the base layer. After the base layer of resin and glass was cured, the mold and support post were removed. Then additional layers of resin saturated glass reinforcement were laminated on over the base layer, first to complete a corrosion barrier, then to complete a structural laminate. Application of resinous matrix laminates is continued until a desired thickness of material is achieved. Fiber reinforcement utilized in the resinous matrix can be by means of fiber cloth, cloth tape, woven rovings, strands, mat, veil, or any combination of the like. The fiber reinforced resinous matrix must be built up upon the mold or upon the base layer until the outside dimensions approximate the outside dimensions desired in the finished product. After the resinous matrix has cured, the outlet end of the nozzle was trimmed with a saw to provide a finished nozzle.

The foregoing description of the preferred embodiments of the invention have been presented for purposes of illustration and description and for providing an understanding of the invention. It is not intended to be exhaustive or to limit the invention to the precise form disclosed. Obviously, many modifications and variations are possible in light of the above teaching. The particular embodiments were chosen and described in some detail to best explain the principles of the invention and its practical application to thereby enable others skilled in the relevant art to best utilize the invention in various embodiments and with various modifications as are suited to the particular use contemplated. Changes and modifications from the specifically described embodiments can be carried out without departing from the scope of the invention. It is intended that the invention be defined by the appended claims.

I claim:

1. A fibre reinforced resin structure comprising:
   a. a primary structure comprising a primary wall having an interior primary surface and an exterior primary surface, and having a through branch opening defined by a circumferential wall edge portion, said wall edge portion having an interior primary edge surface portion of said interior primary surface,
   b. an integrally formed branch structure comprising:
      i. a generally annular branch portion having an interior branch surface defining a branch passageway, and
      ii. an annular transition portion which is integrally formed with said branch portion and which has an interior annular transition surface which in peripheral cross section has a convex curvature and which forms with said branch surface a substantially continuous and uninterrupted surface, said transition portion having a branch structure bonding surface which is positioned against and is bonded to a matching primary bonding surface of said primary structure, with said interior annular transition surface meeting said interior primary surface at a juncture line, with adjacent areas of said interior annular transition surface and said interior primary surface forming a continuous and aligned surface region.

2. The structure as recited in claim 1, wherein said primary structure has an interior corrosion resistant layer defining said interior primary surface, and said branch structure has an interior corrosion resistant layer providing said branch surface and said interior annular transition surface.

3. The structure as recited in claim 2, wherein said interior corrosion resistant layers comprise resin.

4. The structure as recited in claim 2, wherein the interior corrosion resistant layer of said branch structure extends from said juncture line over said matching primary bonding surface so as to be bonded thereto.

5. The structure as recited in claim 4, wherein said matching primary bonding surface is a champhered surface which has a slant of no greater than 45° relative to said interior primary surface, and meets said interior primary surface at said juncture line.

6. The structure as recited in claim 5, wherein said angle is less than 45°.

7. The structure as recited in claim 6, wherein said angle is less than 30°.

8. The structure as recited in claim 7, wherein said angle is less than 20°.

9. The structure as recited in claim 1, wherein said primary structure is a pipe.

10. The structure as recited in claim 1, wherein said matching primary bonding surface is a champhered surface which has a slant of no greater than 45° relative to said interior primary surface and meets said interior primary surface of said juncture line.

11. The structure as recited in claim 10, wherein said angle is less than 45°.

12. The structure as recited in claim 11, wherein said angle is less than 30°.

13. The structure as recited in claim 12, wherein said angle is less than 20°.

14. A fibre reinforced resin structure comprising:
a. a primary structure comprising a primary wall having an interior primary surface and an exterior primary surface, and having a through branch opening defined by a wall edge portion, said wall edge portion having an interior primary edge surface portion of said interior primary surface and a champhered exterior surface portion extending at a slant from said exterior primary surface inwardly toward said branch opening to meet said interior primary surface portion at an edge line and forming an angle with said interior primary surface portion of less than 45°;
b. a branch structure comprising a branch wall having an interior branch surface which is spaced from said wall edge portion and which is aligned transversely relative to said interior primary surface;
c. a transition structure joined to said primary structure and said branch structure, said transition structure having an annular configuration and an interior annular transition surface which in peripheral cross section has a convex curvature and has a sloping transition structure bonding surface which is positioned against and is bonded to said champhered exterior surface portion, with said annular transition surface meeting said interior primary edge surface portion at a juncture line, and with adjacent areas of said interior annular transition surface and said interior primary edge surface portion forming a continuous and aligned surface region.

15. The structure as recited in claim 14, wherein said primary structure has an interior corrosion resistant layer defining said interior primary surface, said branch structure has an interior corrosion resistant layer providing said branch surface and said transition structure has a corrosion resistant inner layer defining said interior transition surface.

16. The structure as recited in claim 15, wherein the interior corrosion resistant layer of said transition structure extends from said juncture line over said champhered exterior surface portion so as to be bonded thereto.

17. The structure as recited in claim 16, wherein said interior corrosion resistant layers comprise resin.

18. The structure as recited in claim 17, wherein said angle is less than 20°.

19. The structure as recited in claim 14, wherein said primary structure is a pipe.

20. The structure as recited in claim 14, wherein said angle is less than 20°.

* * * * *